United States Patent
Endo et al.

(10) Patent No.: US 11,992,892 B2
(45) Date of Patent: May 28, 2024

(54) RESISTANCE SPOT WELDING METHOD AND METHOD FOR PRODUCING RESISTANCE SPOT WELDED JOINT

(71) Applicant: JFE Steel Corporation, Tokyo (JP)

(72) Inventors: Reiko Endo, Tokyo (JP); Muneo Matsushita, Tokyo (JP); Koichi Taniguchi, Tokyo (JP); Hiroshi Matsuda, Tokyo (JP); Rinsei Ikeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 962 days.

(21) Appl. No.: 16/967,193

(22) PCT Filed: Feb. 5, 2019

(86) PCT No.: PCT/JP2019/004069
§ 371 (c)(1),
(2) Date: Aug. 4, 2020

(87) PCT Pub. No.: WO2019/156073
PCT Pub. Date: Aug. 15, 2019

(65) Prior Publication Data
US 2021/0362266 A1   Nov. 25, 2021

(30) Foreign Application Priority Data
Feb. 9, 2018   (JP) ................... 2018-021591

(51) Int. Cl.
*B23K 11/11*   (2006.01)
*B23K 11/16*   (2006.01)
(Continued)

(52) U.S. Cl.
CPC ............. *B23K 11/115* (2013.01); *B23K 11/16* (2013.01); *B23K 11/24* (2013.01); *C21D 6/004* (2013.01);
(Continued)

(58) Field of Classification Search
CPC ....... B23K 11/115; B23K 11/16; B23K 11/24; B23K 2101/006; B23K 2101/18;
(Continued)

(56) References Cited

U.S. PATENT DOCUMENTS

2014/0305912 A1   10/2014   Taniguchi et al.
2016/0067814 A1*   3/2016   Furusako ........... B23K 11/3054
                                                         219/86.7
(Continued)

FOREIGN PATENT DOCUMENTS

| CN | 102625740 A | 8/2012 |
| CN | 103958110 A | 7/2014 |

(Continued)

OTHER PUBLICATIONS

International Search Report and Written Opinion for International Application No. PCT/JP2019/004069, dated Apr. 23, 2019, 6 pages.

(Continued)

*Primary Examiner* — Adil A. Siddiqui
(74) *Attorney, Agent, or Firm* — Buchanan, Ingersoll & Rooney PC

(57) ABSTRACT

The present invention provides a resistance spot welding method. A resistance spot welding method according to the present invention in which a sheet combination of two or more overlapping steel sheets is sandwiched between a pair of electrodes and joined together by applying current while applying pressure, the method including a main current application step in which current application is performed with a current $I_w$ (kA), and subsequently, a post-tempering heat treatment step in which after cooling is performed for a cooling time $t_{ct}$ (ms) shown in formula (1) below, current application is performed with a current $I_t$ (kA) shown in formula (2) below for a current application time $t_t$ (ms)

(Continued)

shown in formula (3) below: $800 \leq t_{ct}$ ... formula (1), $0.5 \times I_w \leq I_t \leq I_w$ ... formula (2), and $500 \leq t_t$ ... formula (3).

8 Claims, 1 Drawing Sheet

(51) Int. Cl.
| | |
|---|---|
| *B23K 11/24* | (2006.01) |
| *B23K 101/00* | (2006.01) |
| *B23K 101/18* | (2006.01) |
| *B23K 103/04* | (2006.01) |
| *C21D 6/00* | (2006.01) |
| *C21D 9/50* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |

(52) U.S. Cl.
CPC ............ *C21D 9/50* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *B23K 2101/006* (2018.08); *B23K 2101/18* (2018.08); *B23K 2103/04* (2018.08)

(58) Field of Classification Search
CPC .... B23K 2103/04; B23K 31/00; C21D 6/004; C21D 9/50; C22C 38/002; C22C 38/02; C22C 38/04; C22C 38/06; C22C 38/42; C22C 38/44; C22C 38/46; C22C 38/48; C22C 38/50; C22C 38/54
See application file for complete search history.

(56) References Cited

U.S. PATENT DOCUMENTS

| | | | |
|---|---|---|---|
| 2017/0080515 A1 | 3/2017 | Furusako et al. | |
| 2019/0001429 A1* | 1/2019 | Sawanishi | B23K 11/115 |

FOREIGN PATENT DOCUMENTS

| | | | |
|---|---|---|---|
| CN | 105358284 A | 2/2016 | |
| CN | 106255566 A | 12/2016 | |
| EP | 2474381 A1 | 7/2012 | |
| EP | 2783782 A1 | 10/2014 | |
| EP | 3020499 A1 | 5/2016 | |
| JP | 2009241086 A | 10/2009 | |
| JP | 2010172946 A | 8/2010 | |
| JP | 2011067853 A | 4/2011 | |
| JP | 2013128945 A | 7/2013 | |
| JP | 5333560 A | 11/2013 | |
| JP | 2016068142 A | 5/2019 | |
| WO | 2014171495 A1 | 10/2014 | |
| WO | 2017010071 A1 | 1/2017 | |
| WO | WO2017010072 A1 | 1/2017 | |
| WO | WO-2017104647 A1 * | 6/2017 | B23K 11/115 |

OTHER PUBLICATIONS

Chinese Office Action for Chinese Application No. 201980012419.X, dated Jun. 1, 2021 with Concise Statement of Relevance of Office Action, 10 pages.
Japanese Office Action for Japanese Application No. 2019-526617, dated May 19, 2020 with Concise Statement of Relevance of Office Action, 4 pages.
Extended European Search Report for European Applicaion No. 19751640.4, dated Mar. 29, 2021, 6 pages.

* cited by examiner

RESISTANCE SPOT WELDING METHOD AND METHOD FOR PRODUCING RESISTANCE SPOT WELDED JOINT

CROSS REFERENCE TO RELATED APPLICATIONS

This is the U.S. National Phase application of PCT/JP2019/004069, filed Feb. 5, 2019, which claims priority to Japanese Patent Application No. 2018-021591, filed Feb. 9, 2018, the disclosures of these applications being incorporated herein by reference in their entireties for all purposes.

FIELD OF THE INVENTION

The present invention relates to a resistance spot welding method and a method for producing a resistance spot welded joint.

BACKGROUND OF THE INVENTION

In recent years, various types of high-strength steel sheets (high-tensile strength steel sheets) have been increasingly applied to automobile bodies from the viewpoint of reducing body weight to improve fuel efficiency and securing crashworthiness. Resistance spot welding (hereinafter, may also be referred to as "spot welding") is used primarily for joining members formed of such high-strength steel sheets, such as automobile structural members in automobile assembly lines. Spot welded joints are required to have strength (tensile strength) to prevent fracture even at the time of collision deformation by securing crashworthiness as described above. The strength of welded joint (hereinafter, may also be referred to as "joint strength") is generally evaluated by the following method. The joint strength of a spot weld zone of a welded joint is evaluated in terms of TSS (Tensile shear strength) which is tensile strength in the shear direction of the joint (tensile shear strength) and CTS (Cross tension strength) which is tensile strength in the peeling direction of the joint (cross tension strength).

The TSS of the spot weld zone tends to increase with the tensile strength of the base material. However, it is considered that the CTS of the spot weld zone may decrease in some cases when the tensile strength of the base material is 780 N/mm$^2$ (780 MPa) or more. In the case where the CTS decreases, the fracture form changes from plug fracture which is ductile fracture occurring in the base material around the spot weld zone or in the HAZ to interfacial fracture or partial plug fracture which is brittle fracture occurring in the nugget. In general, the reason for the decrease in CTS is considered to be occurrence of brittle fracture due to segregation of P and S in the nugget edge and hardening of the nugget edge after quenching. In order to overcome such brittle fracture, various studies have been made on a postheating method in which current application is performed again after main current application.

As the postheating method in which current application is performed again after main current application, for example, Patent Literature 1 and Patent Literature 2 each disclose a technique in which current application is performed for a short time as postheating. Specifically, Patent Literature 1 describes a method in which postheating is performed under conditions satisfying formulae: $0.70 \times WC \leq PC1 \leq 0.90 \times WC$ and $40 \leq Pt1 \leq 80$ (where WC is the welding current (kA), PC1 is the post-welding postheating current (kA), and Pt1 is the post-welding postheating time (ns)), and Patent Literature 2 describes a method in which postheating is performed under conditions satisfying formulae: $0.70 \times WC \leq PHC1 \leq 0.90 \times WC$ and $40 \leq PHT1 \leq 80$ (where WC is the welding current (kA), PHC1 is the postheating current (kA), and PHT1 is the postheating time (ms)).

Furthermore, Patent Literature 3 describes a technique in which cross tension strength is enhanced by a tempering method in which after forming a nugget, cooling is performed for a long time, and then, postheating is performed for a short time with a higher current than that for the initial current application.

PATENT LITERATURE

PTL 1: Japanese Unexamined Patent Application Publication No. 2011-67853
PTL 2: Japanese Unexamined Patent Application Publication No. 2009-241086
PTL 3: Japanese Unexamined Patent Application Publication No. 2010-172946

SUMMARY OF THE INVENTION

However, when the technique of Patent Literature 1 or 2 is applied to a steel sheet containing, as a steel sheet component, Mn: 2.5 to 10.0% by mass (hereinafter, referred to as the "medium Mn steel sheet"), the following problems exist.

In order to obtain toughness of the nugget edge, it is necessary first to form a nugget by main current application and then to induce martensitic transformation by a cooling process. Subsequently, the martensite structure is tempered by reheating to produce tempered martensite. Since tempered martensite is a structure exhibiting high toughness compared with as-quenched martensite, it is possible to improve CTS that is greatly influenced by stress concentration at the nugget edge. However, in short-time cooling and postheating as in the technique described in Patent Literature 1 or 2, it is not possible to ensure complete martensitic transformation or produce a tempered martensite structure. Therefore, the effect of improving toughness by tempering cannot be obtained, and stable joint strength cannot be obtained.

In the technique described in Patent Literature 3, which is a method of performing postheating with a higher current than that for the initial current application, the tempering effect also cannot be obtained.

Furthermore, as another method to overcome brittle fracture, a spot welding method including single current application only may be mentioned. However, when this method is applied to a high-strength steel sheet with a tensile strength of 780 MPa or more, a so-called quenched structure is produced by heating with single current application only, and the austenite structure undergoes martensitic transformation to a hard brittle martensite structure. As a result, a problem arises in that cross tension strength is decreased.

In view of the problems described above, it is an object according to aspects of the present invention to provide a resistance spot welding method and a method for producing a resistance spot welded joint, each capable of improving joint strength by preventing embrittlement in the nugget edge of a spot weld zone and reducing segregation at the nugget edge, even in a high-strength steel sheet with a tensile strength of 780 MPa or more, in particular, in a medium Mn steel sheet.

As described above, as the strength of a steel sheet increases, the cross tension strength decreases. The reason for this is considered to be embrittlement of the nugget edge due to segregation during solidification and formation of a hardened structure by quenching. Accordingly, the present inventors have performed thorough studies on a method for improving the cross tension strength of such a high-strength steel sheet, i.e., each of a mechanism of the decrease in cross tension strength in resistance spot welding of a sheet combination including a high-strength steel sheet with a tensile strength of 780 MPa or more and a method for improving cross tension strength.

As a result, it has become evident that there are appropriate postheating conditions to improve cross tension strength. Specifically, first, main current application is performed with a current $I_w$ (kA) for the purpose of heating to a melting point or higher in order to form a nugget. Then, by adding a cooling process in which quenching is performed to a temperature at which a melt zone is solidified and austenite is transformed into martensite, and subsequently a heating process in which a current $I_t$ (kA) is applied for the purpose of heating to just below the $A_1$ point, the tempering effect on the hardened portion at the nugget edge can be obtained.

Furthermore, it has become evident that, between the main current application step for forming a nugget and the post-tempering heat treatment step, by adding a short-time cooling process for completing solidification and a subsequent process in which a current $I_p$ (kA) for the purpose of reheating to near the melting point, solidification segregation of the nugget edge can be reduced.

By providing these processes, cross tension strength is improved compared with the case of current application $I_w$ (kA) only. The results described above show that by employing the current application pattern according to aspects of the present invention, cross tension strength can be improved.

Aspects of the present invention have been made on the basis of the findings described above, and are as follows.

[1] A resistance spot welding method in which a sheet combination of two or more overlapping steel sheets is sandwiched between a pair of electrodes and joined together by applying current while applying pressure, the method including a main current application step in which current application is performed with a current $I_w$ (kA), and subsequently, a post-tempering heat treatment step in which after cooling is performed for a cooling time $t_{ct}$ (ms) shown in formula (1) below, current application is performed with a current $I_t$ (kA) shown in formula (2) below for a current application time $t_t$ (ms) shown in formula (3) below, wherein at least one steel sheet in the sheet combination has a composition containing 0.08≤C≤0.3 (% by mass), 0.1≤Si≤0.8 (% by mass), 2.5≤Mn≤10.0 (% by mass), and P≤0.1 (% by mass), with the balance being Fe and unavoidable impurities: $800 \leq t_{ct}$ ... formula (1), $0.5 \times I_w \leq I_t \leq I_w$ ... formula (2), and $500 \leq t_t$ ... formula (3).

[2] The resistance spot welding method according to [1], further including, between the main current application step and the post-tempering heat treatment step, a post-segregation reduction heat treatment step in which after cooling is performed for a cooling time $t_{cp}$ (ms) shown in formula (4) below, current application is performed with a current $I_p$ (kA) shown in formula (5) below for a current application time $t_p$ (ms) shown in formula (6) below: $10 \leq t_{cp}$ ... formula (4), $0.6 \times I_w \leq I_p \leq 0.99 \times I_w$ ... formula (5), and $400 \leq t_p$ ... formula (6).

[3] The resistance spot welding method according to [1] or [2], wherein at least one steel sheet in the sheet combination has a tensile strength of 780 MPa or more.

[4] A method for producing a resistance spot welded joint by using the resistance spot welding method according to any one of [1] to [3].

According to aspects of the present invention, when a resistance spot welding method is carried out on a sheet combination of a plurality of overlapping steel sheets including at least one high-strength steel sheet, by reducing segregation at a nugget edge in a resistance spot weld zone of the high-strength steel sheet, the joint strength of a resistance spot welded joint can be improved, thus providing a marked industrial effect. In particular, in the case where the resistance spot welding method is carried out on a sheet combination including at least one medium Mn steel sheet, the above-described effect can be further improved.

DETAILED DESCRIPTION OF EMBODIMENTS OF THE INVENTION

A resistance spot welding method and a method for producing a resistance spot welded joint according to aspects of the present invention will be described with reference to the drawings. It should be noted that the present invention is not limited to embodiments.

Figure 1:
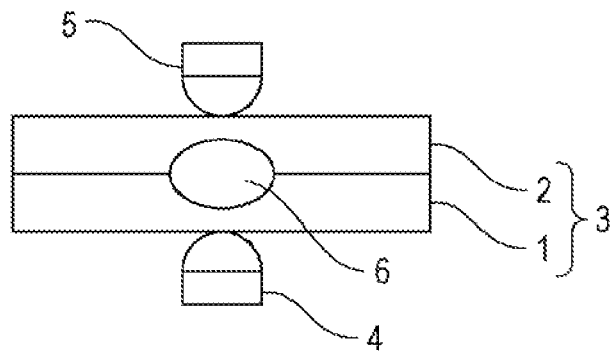
FIG. 1 is a cross-sectional view schematically showing resistance spot welding according to an embodiment of the present invention.

In accordance with aspects of the present invention, total two or more steel sheets including at least one high-strength steel sheet are joined together by resistance spot welding. FIG. 1 shows, as an example, a case where resistance spot welding is carried out on two steel sheets. As shown in FIG. 1, in a resistance spot welding method according to aspects of the present invention, a sheet combination 3 of overlapping steel sheets 1 and 2 is sandwiched between an electrode 4 disposed on the lower side of the sheet combination 3 and an electrode 5 disposed on the upper side of the sheet combination 3 (i.e., between a pair of upper and lower electrodes), and current is applied while applying pressure. Thus, a nugget 6 with a required size is formed to obtain a welded joint. Three or more steel sheets may be overlapped to form a sheet combination 3. In this case, a welded joint can be obtained in the same manner as that of the welding method described above.

Suitable welding equipment for performing such a resistance spot welding method may include a pair of upper and lower electrodes, in which pressure application and current application can be performed with the portion to be welded being interposed between the pair of electrodes, and may further include a pressing force control device and a welding current control device that can freely control the pressing force and the welding current during welding, respectively.

Note that the pressure application mechanism (e.g., an air cylinder, servomotor, or the like), the current control mechanism (e.g., alternating current or direct current), the type (e.g., stationary or robotic gun), and the like are not particularly limited. The type of the power source (single-phase alternating current, AC inverter, or DC inverter) and the like are also not particularly limited. The shape of the electrodes is also not particularly limited. The electrode tip type is, for example, DR type (dome radius type), R type (radius type), or D type (dome type) described in JIS C 9304: 1999.

Aspects of the present invention can be applied to a method of welding a sheet combination of a plurality of sheets including a high-strength steel sheet. For example, in the case of resistance spot welding shown in FIG. 1, at least one of the steel sheet 1 and the steel sheet 2 in the sheet combination 3 is a high-strength steel sheet.

In a high-strength steel sheet, when a solute is segregated and impurities, such as P and S, are excessively concentrated in a cell interface, the cell interface is likely to become brittle. In addition, a nugget tends to be hardened by quenching after spot welding. However, according to aspects of the present invention, by performing diffusion of segregation by reheating at just below the melting point and performing sufficient cooling and reheating to an appropriate temperature to cause martensitic transformation and tempering of martensite, toughness of the nugget edge is improved. This produces an effect in that it is possible to reduce brittle fracture due to segregation in the nugget edge and hardening of the nugget edge after quenching in the resistance spot weld zone of a medium Mn high-strength steel sheet.

Accordingly, in accordance with aspects of the present invention, at least one steel sheet in the sheet combination to be welded is set to be a high-strength steel sheet having a composition containing 0.08≤C≤0.3 (% by mass), 0.1≤Si≤0.8 (% by mass), 2.5≤Mn≤10.0 (% by mass), and P≤0.1 (% by mass), with the balance being Fe and unavoidable impurities. Even in the high-strength steel sheet having such a composition, the above described effect can be obtained. Hereinafter, "%" in each component refers to "percent by mass".

C: 0.08% or more and 0.3% or less

C is an element that can form martensite and the like, thus contributing to strengthening of steel. When the C content is less than 0.08%, the strength level decreases considerably. Accordingly, when the C content is less than 0.08%, it is very difficult to produce a steel sheet with a tensile strength of 780 MPa or more. On the other hand, when the C content exceeds 0.3%, although the strength of the steel sheet increases, a nugget and its surrounding heat-affected zone are excessively hardened, and embrittlement proceeds. Consequently, it is difficult to improve cross tension strength. Therefore, the C content is set to be 0.08% or more and 0.3% or less. The C content is more preferably 0.10% or more and more preferably 0.2% or less.

Si: 0.1% or more and 0.8% or less

When the Si content is 0.1% or more, this effectively acts on strengthening of steel. On the other hand, when the Si content exceeds 0.8%, although steel is strengthened, ductility may be deteriorated due to embrittlement, and toughness may be adversely affected in some cases. Therefore, the Si content is set to be 0.1% or more and 0.8% or less. The Si content is more preferably 0.1% or more and more preferably 0.5% or less.

Mn: 2.5% or more and 10.0% or less

As described above, aspects of the present invention can also be suitably used for a medium Mn steel sheet, and aspects of the present invention are preferably directed to a high-strength steel sheet with a Mn content of 2.5% or more. The reason for this is that when the Mn content is less than 2.5%, even without providing long-time cooling as in accordance with aspects of the present invention, high joint strength can be obtained. On the other hand, when the Mn content exceeds 10.0%, embrittlement or fracture due to embrittlement in the weld zone markedly occurs, which makes it difficult to improve joint strength. Therefore, the Mn content is set to be 2.5% or more and 10.0% or less. The Mn content is more preferably 3.5% or more and more preferably 8.0% or less.

P: 0.1% or less

P is an unavoidable impurity. However, when the P content exceeds 0.1%, strong segregation occurs at the nugget edge of the weld zone, which makes it difficult to improve joint strength. Therefore, the P content is set to be 0.1% or less. More preferably, the P content is 0.02% or less.

In accordance with aspects of the present invention, in addition to the components of the high-strength steel sheet described above, as necessary, one or two or more elements selected from the group consisting of Cu, Ni, Mo, Cr, Nb, V, Ti, B, Al, and Ca may be incorporated as optional components.

Cu, Ni, and Mo are elements that can contribute to improving the strength of steel. Cu is effective in strengthening steel. However, an excessively high Cu content may cause occurrence of fracture. For this reason, when Cu is incorporated, the Cu content is preferably set to be 3% or less, and more preferably 1% or less. Furthermore, from the viewpoint of improving the strength of steel, when Cu is incorporated, the Cu content is preferably set to be 0.005% or more. Ni improves hardenability, but is expensive. For this reason, when Ni is incorporated, from the viewpoint of production cost, the Ni content is preferably set to be 3% or less, and more preferably 1% or less. Furthermore, from the viewpoint of improving hardenability, when Ni is incorporated, the Ni content is preferably set to be 0.005% or more. Mo improves hardenability, but is expensive. Furthermore, at a Mo content of 1.0% or more, the effect is saturated. For this reason, when Mo is incorporated, the Mo content is preferably set to be 1.0% or less, and more preferably 0.8% or less. Furthermore, from the viewpoint of improving hardenability and improving the balance between strength and ductility, when Mo is incorporated, the Mo content is preferably set to be 0.005% or more.

Cr is an element that can improve hardenability. However, there is a concern that an excessively high Cr content may deteriorate the toughness of the HAZ. For this reason, when Cr is incorporated, the Cr content is preferably set to be 1.0% or less, and more preferably 0.8% or less. Furthermore, from the viewpoint of improving hardenability, when Cr is incorporated, the Cr content is preferably set to be 0.01% or more.

Nb and V are elements that can strengthen steel by controlling the structure by means of precipitation strengthening. However, an excessively high Nb content may cause an increase in the amount of hard martensite, and there is a concern that an excessively high V content may cause deterioration in toughness. For this reason, when Nb is incorporated, the Nb content is preferably set to be 0.2% or less, and more preferably 0.1% or less. Furthermore, when Nb is incorporated, in order to ensure HAZ strength, the Nb content is preferably set to be 0.005% or more. When V is incorporated, the V content is preferably set to be 0.5% or less, and more preferably 0.2% or less. Furthermore, when V is incorporated, from the viewpoint of preventing HAZ softening, the V content is preferably set to be 0.003% or more.

Ti and B are elements that can strengthen steel by improving hardenability. However, there is a concern that an excessively high Ti content may increase the amount of hard martensite. For this reason, when Ti is incorporated, the Ti content is preferably set to be 0.2% or less, and more preferably 0.1% or less. Furthermore, from the viewpoint of improving precipitation strengthening, when Ti is incorporated, the Ti content is preferably set to be 0.003% or more. There is a concern that an excessively high B content may saturate the effect. For this reason, when B is incorporated, the B content is preferably set to be 0.005% or less, and more preferably 0.004% or less. Furthermore, from the viewpoint of preventing a decrease in HAZ strength, when B is incorporated, the B content is preferably set to be 0.0001% or more.

Al is an element that can control the structure by austenite grain refining. However, an excessively high Al content may cause deterioration in toughness. Therefore, when Al is incorporated, the Al content is preferably set to be 2% or less, and more preferably 0.1% or less. Furthermore, from the viewpoint of purifying steel by deoxidation, when Al is incorporated, the Al content is preferably set to be 0.01% or more.

Ca is an element that can contribute to improving workability of steel. However, there is a concern that an excessively high Ca content may cause deterioration in toughness. Therefore, when Ca is incorporated, the Ca content is preferably set to be 0.010% or less, and more preferably 0.005% or less. Furthermore, from the viewpoint of improving effects of sulfides, when Ca is incorporated, the Ca content is preferably set to be 0.0005% or more.

As described above, in accordance with aspects of the present invention, in order to obtain these effects, in addition to the components described above, as necessary, one or two or more elements selected from the group consisting of Cu, Ni, Mo, Cr, Nb, V, Ti, B, Al, and Ca can be added.

Balance: Fe and unavoidable impurities

The balance other than the components described above includes Fe and unavoidable impurities.

Furthermore, the tensile strength of the high-strength steel sheet having the components described above is preferably 780 MPa or more. As described above, in particular, when the tensile strength of the base material is 780 MPa or more, there is a concern that CTS may be decreased. According to aspects of the present invention, even in a high-strength steel sheet with a tensile strength of 780 MPa or more, since it is possible to prevent brittle fracture due to segregation of P and S in the nugget edge and hardening of the nugget edge after quenching, a decrease in CTS can be suppressed. Note that even in a high-strength steel sheet with a tensile strength of less than 780 MPa, the effects described above can be naturally obtained.

The effects described above can also be obtained even when at least one steel sheet in the sheet combination to be welded is a zinc-coated steel sheet. In accordance with aspects of the present invention, the term "zinc-coated steel sheet" refers to a steel sheet having a coating layer composed mainly of zinc, and examples of the coating layer composed mainly of zinc include all known zinc coating layers. Specifically, examples of the coating layer composed mainly of zinc include a hot-dip zinc coating layer and an electro-zinc coating layer, and also include an Al coating layer, a Zn—Al coating layer, a Zn—Ni layer, and the like.

Furthermore, regarding the plurality of overlapping steel sheets, a plurality of steel sheets of the same kind may be overlapped, or a plurality of steel sheets of different kinds may be overlapped. There is no problem if the steel sheets have different thicknesses. A surface-treated steel sheet having a coating layer and a steel sheet without a coating layer may be overlapped to each other. When the sheet thickness is increased, stress concentrates at the nugget edge, and therefore, the sheet thickness is preferably 0.4 mm to 2.2 mm.

Aspects of the present invention relate to a resistance spot welding method in which steel sheets are overlapped together, and a step of applying current to a sheet combination 3 (a steel sheet 1 and a steel sheet 2) by using an electrode 4 and an electrode 5, as shown in FIG. 1, is controlled as follows.

First, a main current application step is performed, in which current application is performed with a current $I_w$ (kA). Subsequently, a post-tempering heat treatment step is performed, in which after cooling is performed for a cooling time $t_{ct}$ (ns) shown in formula (1) below, current application is performed with a current $I_t$ (kA) shown in formula (2) below for a current application time t (ins) shown in formula (3) below: $800 \leq t_{ct}$ . . . formula (1), $0.5 \times I_w \leq I_t \leq I_w$ . . . formula (2), and $500 \leq t_t$ . . . formula (3).

[Main Current Application Step]

The main current application step is a current application step in which the overlapping portions of the steel sheet 1 and the steel sheet 2 are melted to form a nugget 6. In accordance with aspects of the present invention, current application conditions and pressure application conditions for forming the nugget 6 in the main current application step are not particularly limited. Commonly used welding conditions can be employed.

In the case where a high-strength steel sheet having the steel sheet composition described above is used, main current application is performed preferably under the current application conditions of 120 ms to 400 ms and preferably under the pressure application conditions of 2.0 kN to 4.0 kN.

[Post-Tempering Heat Treatment Step]

The post-tempering heat treatment step is a postheat treatment step in which the edge of the nugget 6 formed in the main current application step is tempered to improve toughness. In order to obtain the effect of improving toughness by tempering the nugget edge, it is important to control welding conditions in the post-tempering heat treatment step as follows.

First, cooling is performed for a cooling time $t_{ct}$ (ms) shown in the above formula (1), and subsequently, tempering current application is performed with a current $I_t$ (kA) shown in the above formula (2) for a current application time $t_t$ (ms) shown in the above formula (3).

When the cooling time $t_{ct}$ (ms) is less than 800 (ms), the nugget 6 cannot be cooled to a temperature at which martensitic transformation occurs. As a result, retained austenite, which has not been transformed into martensite, is transformed into a martensite structure or a retained austenite structure by reheating and recooling. Since these structures are not tempered martensite, they do not have toughness and remain hard. Therefore, the cooling time $t_{ct}$ (ms) is set to be 800 (ms) or more. In order to further promote tempering, the cooling time $t_{ct}$ (ms) is preferably 1,000 (ms) or more, and more preferably 1,200 (ms) or more.

Although the upper limit of the cooling time $t_{ct}$ (ms) is not particularly limited, the cooling time $t_{ct}$ (ms) is preferably 20,000 (ms) or less. When the cooling time $t_{ct}$ (ms) exceeds 20,000 (ms), improvement in the above-described effect cannot be expected, and productivity is hindered, which is undesirable. The cooling time $t_{ct}$ (ms) is preferably 10,000 (ms) or less. When the cooling time $t_{ct}$ (ms) is 10,000 (ms) or less, a sufficient tempering effect can be obtained, and therefore, most of the austenite structure of the nugget edge can be transformed into the tempered martensite structure. In the case where more emphasis is placed on productivity, as the postheating time for tempering the nugget edge, the cooling time $t_{ct}$ is more preferably set to be 2,000 (ms) or less.

When the current $I_t$ (kA) for tempering current application is less than $0.5 \times I_w$ (kA), it is not possible to achieve a temperature just below the $A_1$ point that is sufficient for tempering martensite. As a result, a tempered martensite structure is not formed, and the hard, brittle martensite structure remains, thus being unable to improve toughness of the nugget edge. On the other hand, when the current $I_t$ (kA) exceeds the current $I_w$ (kA) for main current application, since the temperature exceeds the $A_1$ point, the tempering effect on the nugget edge cannot be obtained. Therefore, the range of the current $I_t$ (kA) is set to be $0.5 \times I_w$ (kA) or more and $I_w$ (kA) or less, and preferably $0.6 \times I_w$ (kA) or more and $0.99 \times I_w$ (kA) or less.

When the current application time $t_t$ (ms) for tempering current application is less than 500 (ms), the heating time is not sufficient for obtaining the tempering effect intended in accordance with aspects of the present invention. Therefore, the current application time $t_t$ (ms) is set to be 500 (ms) or more. The current application time $t_t$ (ms) is preferably 1,000 (ms) or more. In order to further improve joint strength by tempering the nugget edge for a longer time, the current application time $t_t$ (ms) is more preferably 1,500 (ms) or more. Furthermore, in order to improve the tempering effect, the current application time $t_t$ (ms) is still more preferably 1,800 (ms) or more.

Although the upper limit of the current application time $t_t$ (ms) for tempering current application is not particularly limited, the current application time $t_t$ (ms) is desirably set to be 20,000 (ns) or less. When the current application time $t_t$ (ms) exceeds 20,000 (ms), productivity is hindered, which is undesirable. The current application time $t_t$ is more preferably 8,000 (ms) or less, and still more preferably 3,000 (ms) or less.

Figure 2:
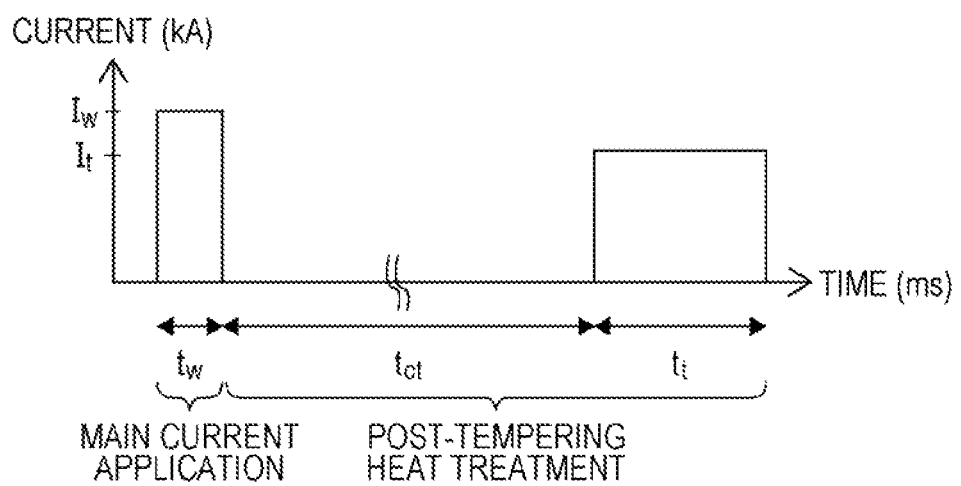
FIG. 2 is a graph showing a current application pattern according to an embodiment of the present invention.

FIG. 2 shows an example of a current application pattern in the resistance spot welding method according to aspects of the present invention described above. The main current application step and the post-tempering heat treatment step are controlled in the current application pattern shown in FIG. 2.

Specifically, the current for main current application in the main current application step is set at $I_w$ (kA), and the current application time for main current application is set at $t_w$ (ms). Furthermore, the cooling time in the post-tempering heat treatment step, which is postheating, is set at $t_{ct}$ (ms), and the current is set at $I_t$ (kA). The current $I_t$ (kA) is set to be less than the current $I_w$ (kA) for main current application, and the current application time is set at $t_t$ (ms). As shown in FIG. 1, a sheet combination 3 (steel sheets 1 and 2) is sandwiched between a pair of electrodes 4 and 5, and by applying current in the current application pattern shown in FIG. 2, a nugget 6 is formed at the boundary between the steel sheets 1 and 2.

According to aspects of the present invention, in the post-tempering heat treatment step, tempering current application is performed, at a temperature just below the $A_1$ point and for a long time of 500 (ms) or more, on the nugget 6 formed by main current application. Therefore, even in the case where the sheet combination 3 includes a high-strength steel sheet having the steel sheet composition described above, toughness can be improved by tempering the edge of the nugget 6.

In accordance with aspects of the present invention, from the viewpoint of more effectively improving joint strength, between the main current application step and the post-tempering heat treatment step, a post-segregation reduction heat treatment step can be further included, in which after cooling is performed for a cooling time $t_{cp}$ (is) shown in formula (4) below, current application is performed with a current $I_p$ (kA) shown in formula (5) below for a current application time $t_p$ (ms) shown in formula (6) below:
$10 \leq t_{cp}$ ... formula (4), $0.6 \times I_w \leq I_p \leq 0.99 \times I_w$ ... formula (5), and $400 \leq t_p$ ... formula (6).

[Post-Segregation Reduction Heat Treatment Step]
(Preferable Condition)

The post-segregation reduction heat treatment step is a postheat treatment step for reducing segregation in the nugget edge of the nugget 6 formed in the main current application step. In order to obtain the effect of reducing segregation in the nugget edge, welding conditions in the post-segregation reduction heat treatment step performed between the main current application step and the post-tempering heat treatment step are preferably controlled as follows.

First, preferably, cooling is performed for a cooling time $t_{cp}$ (ms) shown in the above formula (4), and subsequently, current application is performed again with a current $I_p$ (kA) shown in the above formula (5) for a current application time $t_p$ (ms) shown in the above formula (6).

When the cooling time $t_{cp}$ (ms) in the post-segregation reduction heat treatment step is less than 10 (ns), the time may not be sufficient to complete solidification of the molten nugget 6 in some cases. As a result, the nugget maintains the molten state, and it is not possible to achieve reduction of segregation of impurities due to diffusion of solute atoms after solidification, which is the effect of the post-segregation reduction heat treatment step. Therefore, the cooling time $t_{cp}$ (ms) is preferably set to be 10 (ms) or more, more preferably 100 (ms) or more, and still more preferably 200 (ms) or more.

Although the upper limit of the cooling time $t_{cp}$ (ms) is not particularly limited, the cooling time $t_{cp}$ (ms) is preferably set to be 750 (ms) or less. When the cooling time $t_{cp}$ (ms) exceeds 750 (ms), cooling progresses excessively, and it takes a time to reheat to a temperature just below the melting point in the subsequent heating process (current application for segregation reduction in the post-segregation reduction heat treatment step), which is undesirable. The cooling time $t_{cp}$ (ms) is more preferably 700 (ms) or less, and still more preferably 250 (ms) or less.

When the current $I_p$ (kA) for segregation reduction current application in the post-segregation reduction heat treatment step is less than $0.6\times I_w$ (kA), there is a concern that reheating cannot be performed to the temperature near the melting point. On the other hand, when the current $I_p$ (kA) exceeds $0.99\times I_w$ (kA), since the nugget 6 is remelted, there is a concern that the effect of reducing solidification segregation by diffusion in the solid-phase state just below the melting point cannot be obtained. Therefore, the range of the current $I_p$ (kA) is preferably set to be $0.6\times I_w$ (kA) or more and $0.99\times I_w$ (kA) or less, and more preferably $0.8\times I_w$(kA) or more. In order to bring the temperature closer to just below the melting point, the current $I_p$ (kA) is still more preferably $0.87\times I_w$ (kA) or more, and even still more preferably $0.90\times I_w$ (kA) or more. The current $I_p$ (kA) is more preferably $0.98\times I_w$ (kA) or less.

When the current application time $t_p$ (ms) for segregation reduction current application in the post-segregation reduction heat treatment step is less than 400 (ms), there is a concern that the effect of reducing solidification segregation by diffusion cannot be sufficiently obtained. Therefore, the current application time t (ins) is preferably set to be 400 (ns) or more, and more preferably 600 (ns) or more.

Although the upper limit of the current application time $t_p$ (is) for segregation reduction current application in the post-segregation reduction heat treatment step is not particularly limited, the current application time $t_p$ (is) is preferably set to be 8,000 (ns) or less. When the current application time $t_p$ (ms) exceeds 8,000 (is), the above-described effect is unlikely to be obtained, and productivity is hindered, thus being undesirable. The current application time $t_p$ is preferably 7,000 (ns) or less, and more preferably 2,000 (ms) or less.

Figure 3:
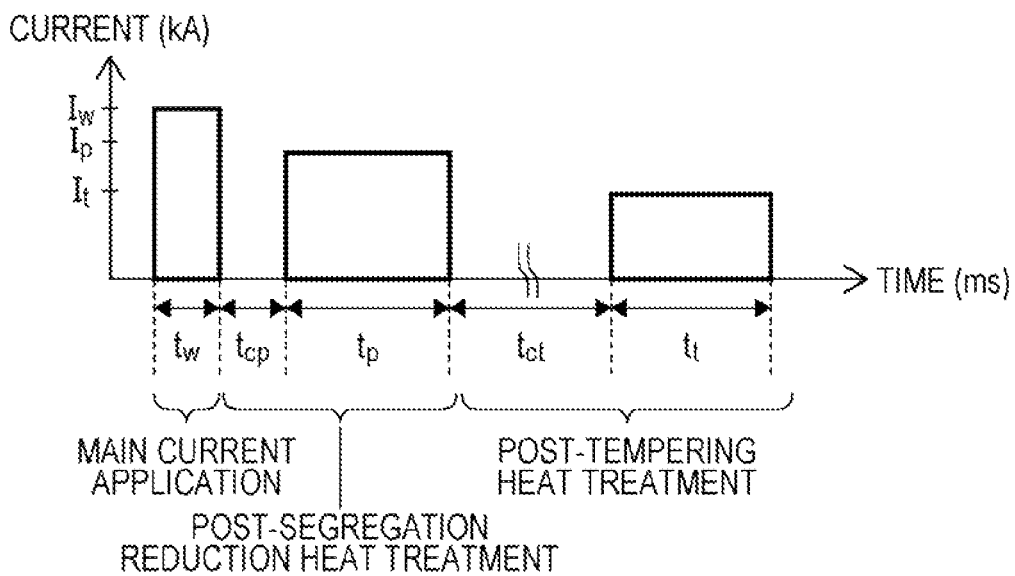
FIG. 3 is a graph showing a current application pattern according to another embodiment of the present invention.

FIG. 3 shows an example of a current application pattern in the resistance spot welding method according to aspects of the present invention which further includes the post-segregation reduction heat treatment step between the main current application step and the post-tempering heat treatment step. The main current application step, the post-segregation reduction heat treatment step, and the post-tempering heat treatment step are controlled in the current application pattern shown in FIG. 3.

Specifically, the current for main current application in the main current application step is set at $I_w$ (kA), and the current application time for main current application is set at $t_W$ (ms). The cooling time in the post-segregation reduction heat treatment step is set at $t_{cp}$ (ms), and the current for segregation reduction current application is set at $I_p$ (kA). The current $I_p$ (kA) is set to be equal to or less than the current $I_w$ (kA) for main current application$\times 0.99$, and the current application time for segregation reduction current application is set at $t_p$ (ms). Furthermore, the cooling time in the post-tempering heat treatment step, which is postheating, is set at $t_{cr}$ (ms), and the current for postheating is set at $I_t$ (kA). The current $I_t$ (kA) is set to be equal to or less than the current $I_w$ (kA) for main current application, and the current application time for postheating is set at $t_t$ (ms). As shown in FIG. 1, a sheet combination 3 (steel sheets 1 and 2) is sandwiched between a pair of electrodes 4 and 5, and by applying current in the current application pattern shown in FIG. 3, a nugget 6 is formed at the boundary between the steel sheets 1 and 2.

The relationship between the current $I_p$ (kA) and the current $I_t$ (kA) is preferably $I_p \geq I_t$. The segregation reduction current application $I_p$ reduces segregation in the nugget edge at a temperature just below the melting point. On the other hand, the current $I_t$ for current application in post-tempering heat treatment performs tempering by retaining the nugget edge at a temperature equal to or less than the $A_1$ point. The $A_1$ point is greatly lower than the melting point, and even if cooling is performed for the cooling time $t_{cr}$, the relationship between the currents is usually $I_p \geq I_t$.

According to aspects of the present invention, in the post-segregation reduction heat treatment step, the nugget 6 formed by main current application is cooled for a short time and then reheated to near the melting point. Therefore, solidification segregation can be reduced by diffusion in the solid-phase state just below the melting point, and segregation in the edge of the nugget 6 can be reduced. As a result of this, the CTS of the resulting welded joint can be improved.

Next, a method for producing a resistance spot welded joint will be described.

Aspects of the present invention relate to a method for producing a resistance spot welded joint using the resistance spot welding method described above. In the method for producing a resistance spot welded joint according to aspects of the present invention, resistance spot welding is performed in which, for example, a sheet combination of two or more overlapping steel sheets is sandwiched between a pair of electrodes and current is applied under predetermined welding conditions while applying pressure, thereby forming a nugget with a required size to obtain a resistance spot welded joint. The steel sheets, welding conditions, and the like are the same as those described above.

As described above, in the resistance spot welding method and the method for producing a resistance spot welded joint according to aspects of the present invention, by appropriately controlling welding conditions in the post-step, i.e., the post-tempering heat treatment step, the nugget edge is tempered to improve toughness. As a result of this, it is possible to improve the joint strength of the resulting welded joint. Furthermore, by performing the reheating step (post-segregation reduction heat treatment step) between the main current application step and the post-tempering heat treatment step, solidification segregation of the nugget edge is reduced, and CTS is improved. Therefore, even in the case where a medium Mn steel sheet having the steel sheet composition described above is included as a high-strength steel sheet in the sheet combination, joint strength can be further improved.

Preferably, the nugget obtained according to aspects of the present invention has a composition containing $0.05 \leq C \leq 0.35$ (% by mass), $0.1 \leq Si \leq 0.8$ (% by mass), and $2.0 \leq Mn \leq 10$ (% by mass). The composition of the nugget may be obtained by a method in which a nugget is cut out from a sample produced by the method described above, and chemical analysis is performed. Alternatively, the composition may be obtained using a cross-sectional photograph of a weld zone, and converting the steel sheet component contents of each of the steel sheets with the cross-sectional area ratio between the melt zones of the upper and lower steel sheets.

EXAMPLES

The effects and advantages of aspects of the present invention will be described below on the basis of examples. It is to be noted that the present invention is not limited to the examples described below.

In examples of the present invention, on a sheet combination 3 of overlapping two steel sheets (a lower steel sheet 1 and an upper steel sheet 2) as shown in FIG. 1, resistance spot welding was performed using a resistance welder of a servomotor pressing type attached to a C gun and having a direct-current power source. A nugget 6 with a required size was formed, and a resistance spot welded joint was produced.

As specimens, 780 MPa to 1,180 MPa class high-strength steel sheets (steel sheets A to F) with a thickness of 1.2 mm were used. The size of the specimens was as follows: a long side of 150 mm and a short side of 50 mm. As the steel sheets A to F, steel sheets having compositions shown in Table 1-1 were used. Hereinafter, "%", which shows the composition of the steel sheet, means "% by mass" unless otherwise stated.

First, using the specimens thus obtained, sheet combinations 3 were formed. As shown in Table 1-2, sheet combinations a and b are sheet combinations in which two medium Mn steel sheets of the same kind are overlapped. A sheet combination c is a sheet combination in which medium Mn steel sheets of different kinds are overlapped. Sheet combinations d and e are sheet combinations in which a medium Mn steel sheet and a high-strength steel sheet are overlapped. A sheet combination f is a sheet combination in which same high C steel sheets are overlapped. A sheet combination g is a sheet combination in which same high Mn steel sheets are overlapped. A sheet combination h is a sheet combination in which three medium Mn steel sheets of the same kind are overlapped. Sheet combinations i and j are sheet combinations in which medium Mn steel sheets containing the optional components described above are overlapped. The sheet combinations a to g, i, and j all have the same thickness.

Next, using the sheet combinations 3, by performing resistance spot welding under the welding conditions shown in Tables 2-1 and 2-2, nuggets 6 with a required size were formed, and resistance spot welded joints were obtained. In this process, current application was performed under the conditions described below. The pressing force during current application was set to be constant, at 3.5 kN. Furthermore, as each of the lower electrode 4 and the upper electrode 5, a DR type electrode made of chromium copper with a tip diameter of 6 mm and a tip curvature radius of 40 mm was used. The nugget was formed so as to have a diameter of 5.5√t (mm) or less when the sheet thickness was set at t (mm).

Using the resulting resistance spot welded joints, CTS was evaluated by the method described below.

[Evaluation of CTS]

In the evaluation of CTS, a cross tension test was carried out on the resulting resistance spot welded joints by the method stipulated in JIS Z 3137 and CTS (cross tension strength) was measured. A specimen in which the measured value is JIS "A" level (3.4 kN) or higher is denoted by symbol ○, and a specimen in which the measured value is lower than JIS "A" level is denoted by symbol x. In this example, in the case of symbol ○, evaluated as good, and in the case of symbol x, evaluated as poor. Tables 2-1 and 2-2 show the CTS evaluation results in the resistance spot welded joins after welding.

TABLE 1-1

| Steel sheet | Composition (mass %) | | | | | | | | | | | | | |
|---|---|---|---|---|---|---|---|---|---|---|---|---|---|---|
| | C | Si | Mn | P | Cu | Ni | Mo | Cr | Nb | V | Ti | B | Al | Ca |
| A | 0.20 | 0.6 | 4.0 | 0.01 | — | — | — | — | — | — | — | — | — | — |
| B | 0.10 | 0.2 | 6.0 | 0.01 | — | — | — | — | — | — | — | — | — | — |
| C | 0.10 | 1.1 | 1.2 | 0.01 | — | — | — | — | — | — | — | — | — | — |
| D | 0.13 | 0.8 | 1.2 | 0.01 | — | — | — | — | — | — | — | — | — | — |
| E | 0.58 | 0.25 | 0.75 | 0.03 | — | — | — | — | — | — | — | — | — | — |
| F | 0.28 | 0.7 | 12.0 | 0.01 | — | — | — | — | — | — | — | — | — | — |
| G | 0.20 | 0.2 | 3.0 | 0.01 | — | — | — | — | 0.050 | 0.050 | — | — | — | 0.005 |
| H | 0.10 | 0.4 | 4.0 | 0.01 | 0.500 | 0.500 | 0.200 | — | — | — | — | — | 0.030 | — |
| I | 0.10 | 0.3 | 5.0 | 0.01 | — | — | — | 0.50 | — | — | 0.030 | 0.0020 | — | — |

TABLE 1-2

| Sheet combination | Overlapping position of steel sheets | Type of steel sheet | Strength | Thickness of steel sheet |
|---|---|---|---|---|
| a | First sheet | Medium Mn steel sheet A | 1180 MPa | 1.2 mm |
|   | Second sheet | Medium Mn steel sheet A | 1180 MPa | 1.2 mm |
| b | First sheet | Medium Mn steel sheet B | 1180 MPa | 1.2 mm |
|   | Second sheet | Medium Mn steel sheet B | 1180 MPa | 1.2 mm |
| c | First sheet | Medium Mn steel sheet A | 1180 MPa | 1.2 mm |
|   | Second sheet | Medium Mn steel sheet B | 1180 MPa | 1.2 mm |
| d | First sheet | Medium Mn steel sheet A | 1180 MPa | 1.2 mm |
|   | Second sheet | Steel sheet C | 980 MPa | 1.2 mm |
| e | First sheet | Medium Mn steel sheet A | 1180 MPa | 1.2 mm |
|   | Second sheet | Steel sheet D | 780 MPa | 1.2 mm |
| f | First sheet | High C steel sheet E | 1180 MPa | 1.2 mm |
|   | Second sheet | High C steel sheet E | 1180 MPa | 1.2 mm |
| g | First sheet | High Mn steel sheet F | 1180 MPa | 1.2 mm |
|   | Second sheet | High Mn steel sheet F | 1180 MPa | 1.2 mm |
| h | First sheet | Medium Mn steel sheet A | 1180 MPa | 0.8 mm |
|   | Second sheet | Medium Mn steel sheet A | 1180 MPa | 0.8 mm |
|   | Third sheet | Medium Mn steel sheet A | 1180 MPa | 0.8 mm |
| i | First sheet | Medium Mn steel sheet G | 1180 MPa | 1.2 mm |
|   | Second sheet | Medium Mn steel sheet H | 1180 MPa | 1.2 mm |
| j | First sheet | Medium Mn steel sheet A | 1180 MPa | 1.2 mm |
|   | Second sheet | Medium Mn steel sheet I | 1180 MPa | 1.2 mm |

TABLE 2-1

| | | Main current application step | | Post-segregation reduction heat treatment step | | | Post-tempering heat treatment step | | | Evaluation | | |
|---|---|---|---|---|---|---|---|---|---|---|---|---|
| Welding No. | Sheet combination | Current (kA) $I_w$ | Current application time (ms) $t_w$ | Cooling time (ms) $t_{cp}$ | Current application for segregation reduction (kA) $I_p$ | Current application time in current application for segregation reduction (ms) $t_p$ | Cooling time (ms) $t_{ct}$ | Current in post-heating (kA) $I_t$ | Current application time in post-heating (ms) $t_t$ | CTS (kN) | CTS determination [*1] | Remarks |
| 1 | a | 6.5 | 280 | — | — | — | — | — | — | 2.5 | x | Comparative Example |
| 2 | a | 6.5 | 280 | — | — | — | 700 | 3.5 | 700 | 2.5 | x | Comparative Example |
| 3 | a | 6.5 | 280 | — | — | — | 9900 | 4.0 | 1980 | 5.1 | ○ | Example |
| 4 | a | 6.5 | 280 | — | — | — | 9900 | 5.0 | 400 | 2.9 | x | Comparative Example |
| 5 | a | 6.5 | 280 | — | — | — | 2000 | 3.5 | 7800 | 8.4 | ○ | Example |
| 6 | a | 6.5 | 280 | 200 | 6.5 | 400 | 2000 | 3.5 | 7800 | 7.0 | ○ | Example |
| 7 | a | 6.5 | 280 | — | — | — | 20000 | 4.0 | 1980 | 5.2 | ○ | Example |
| 8 | a | 6.5 | 280 | 700 | 6.0 | 1980 | 9900 | 4.0 | 1980 | 7.9 | ○ | Example |
| 9 | a | 6.5 | 280 | 200 | 6.3 | 700 | 3000 | 5.0 | 1980 | 6.5 | ○ | Example |
| 10 | a | 6.2 | 320 | — | — | — | 1100 | 4.0 | 1000 | 5.9 | ○ | Example |
| 11 | a | 6.2 | 320 | 100 | 5.8 | 400 | 2000 | 4.0 | 500 | 6.0 | ○ | Example |
| 12 | b | 6.5 | 280 | — | — | — | 800 | 4.0 | 1980 | 3.6 | ○ | Example |
| 13 | b | 6.5 | 280 | — | — | — | 1700 | 5.0 | 1980 | 3.5 | ○ | Example |
| 14 | b | 6.5 | 280 | 200 | 6.0 | 1980 | 700 | 4.0 | 1980 | 2.7 | x | Comparative Example |
| 15 | b | 6.5 | 280 | 200 | 6.0 | 1980 | 3000 | 4.0 | 400 | 3.2 | x | Comparative Example |
| 16 | b | 6.5 | 280 | 200 | 6.0 | 1980 | 4000 | 4.0 | 7800 | 8.4 | ○ | Example |
| 17 | b | 6.5 | 280 | 200 | 6.0 | 1980 | 1000 | 4.0 | 1980 | 4.2 | ○ | Example |
| 18 | c | 6.5 | 280 | 200 | 6.0 | 1980 | 9900 | 2.0 | 1980 | 3.3 | x | Comparative Example |
| 19 | c | 6.5 | 280 | 200 | 4.0 | 7000 | 20000 | 4.0 | 1980 | 5.2 | ○ | Example |
| 20 | c | 6.5 | 280 | 200 | 6.0 | 1980 | 9900 | 7.0 | 1980 | 2.3 | x | Comparative Example |
| 21 | c | 6.5 | 280 | — | — | — | 4000 | 6.0 | 500 | 4.6 | ○ | Example |
| 22 | c | 6.5 | 280 | — | — | — | 6000 | 6.0 | 1980 | 4.2 | ○ | Example |
| 23 | c | 6.5 | 280 | 200 | 5.0 | 1980 | 9900 | 4.0 | 600 | 5.1 | ○ | Example |
| 24 | c | 6.5 | 280 | 200 | 6.0 | 1980 | 2000 | 4.0 | 600 | 5.3 | ○ | Example |
| 25 | c | 6.0 | 300 | — | — | — | 1600 | 4.0 | 1000 | 5.0 | ○ | Example |

*1. ○: 3.4 kN or more x: Less than 3.4 kN

TABLE 2-2

| Welding No. | Sheet combination | Main current application step Current (kA) $I_w$ | Main current application step Current application time (ms) $t_w$ | Post-segregation reduction heat treatment step Cooling time (ms) $t_{cp}$ | Post-segregation reduction heat treatment step Current application for segregation reduction (kA) $I_p$ | Post-segregation reduction heat treatment step Current application time in current application for segregation reduction (ms) $t_p$ | Post-tempering heat treatment step Cooling time (ms) $t_{ct}$ | Post-tempering heat treatment step Current in post-heating (kA) $I_t$ | Post-tempering heat treatment step Current application time in post-heating (ms) $t_t$ | Evaluation CTS (kN) | Evaluation CTS determination [*1] | Remarks |
|---|---|---|---|---|---|---|---|---|---|---|---|---|
| 26 | d | 6.5 | 280 | — | — | — | 600 | 3.5 | 700 | 2.5 | x | Comparative Example |
| 27 | d | 6.5 | 280 | — | — | — | 3000 | 5.0 | 1980 | 4.2 | ○ | Example |
| 28 | d | 6.5 | 280 | — | — | — | 1500 | 4.0 | 1980 | 5.2 | ○ | Example |
| 29 | d | 6.5 | 280 | — | — | — | 1000 | 5.0 | 400 | 3.0 | x | Comparative Example |
| 30 | d | 6.5 | 280 | — | — | — | 2000 | 6.0 | 500 | 4.9 | ○ | Example |
| 31 | d | 6.2 | 320 | 150 | 5.0 | 400 | 1500 | 4.0 | 1000 | 4.2 | ○ | Example |
| 32 | d | 6.5 | 280 | — | — | — | 3000 | 4.0 | 1000 | 5.0 | ○ | Example |
| 33 | d | 6.5 | 280 | 200 | 6.0 | 1000 | 3000 | 4.0 | 1000 | 5.7 | ○ | Example |
| 34 | e | 6.5 | 280 | 700 | 6.0 | 1980 | 1000 | 4.0 | 1980 | 6.5 | ○ | Example |
| 35 | e | 6.5 | 280 | — | — | — | 1000 | 5.0 | 300 | 2.6 | x | Comparative Example |
| 36 | e | 6.5 | 280 | — | — | — | 800 | 4.0 | 1980 | 3.6 | ○ | Example |
| 37 | e | 6.5 | 280 | 700 | 6.0 | 1980 | 1000 | 4.0 | 1980 | 7.9 | ○ | Example |
| 38 | e | 6.5 | 280 | 200 | 6.3 | 700 | 1000 | 5.0 | 1980 | 7.8 | ○ | Example |
| 39 | e | 6.5 | 280 | 200 | 6.0 | 1980 | 9900 | 9.0 | 1980 | 2.7 | x | Comparative Example |
| 40 | f | 6.5 | 280 | — | — | — | 20000 | 4.0 | 1980 | 2.3 | x | Comparative Example |
| 41 | f | 6.5 | 280 | 700 | 6.0 | 1980 | 9900 | 4.0 | 1980 | 2.0 | x | Comparative Example |
| 42 | f | 6.5 | 280 | 200 | 6.3 | 700 | 9900 | 5.0 | 1980 | 2.1 | x | Comparative Example |
| 43 | g | 6.5 | 280 | — | — | — | 20000 | 4.0 | 1980 | 2.1 | x | Comparative Example |
| 44 | g | 6.5 | 280 | 700 | 6.0 | 1980 | 9900 | 4.0 | 1980 | 2.0 | x | Comparative Example |
| 45 | g | 6.5 | 280 | 200 | 6.3 | 700 | 9900 | 5.0 | 1980 | 1.9 | x | Comparative Example |
| 46 | h | 6.5 | 280 | — | — | — | 2000 | 3.5 | 7800 | 7.4 | ○ | Example |
| 47 | h | 6.5 | 280 | — | — | — | 9900 | 4.0 | 1980 | 4.2 | ○ | Example |
| 48 | h | 6.5 | 280 | 200 | 6.3 | 700 | 3000 | 5.0 | 1980 | 5.9 | ○ | Example |
| 49 | i | 6.5 | 280 | — | — | — | 800 | 4.0 | 1980 | 4.7 | ○ | Example |
| 50 | i | 6.5 | 280 | 200 | 6.0 | 1000 | 1000 | 4.0 | 1980 | 5.9 | ○ | Example |
| 51 | j | 6.5 | 280 | — | — | — | 9900 | 4.0 | 1980 | 5.6 | ○ | Example |
| 52 | j | 6.2 | 320 | 100 | 5.8 | 400 | 2000 | 4.0 | 500 | 6.6 | ○ | Example |

*1. ○: 3.4 kN or more
x: Less than 3.4 kN

As shown in Tables 2-1 and 2-2, in Examples in which resistance spot welding was performed in accordance with the method according to aspects of the present invention, good resistance spot welded joints were obtained. In contrast, in Comparative Examples in which the welding conditions of the method according to aspects of the present invention were not satisfied, good joints were not obtained.

REFERENCE SIGNS LIST

1 lower steel sheet
2 upper steel sheet
3 sheet combination
4 lower electrode
5 upper electrode
6 nugget

The invention claimed is:
1. A resistance spot welding method in which a sheet combination of two or more overlapping steel sheets is sandwiched between a pair of electrodes and joined together by applying current while applying pressure, the method comprising:
a main current application step in which current application is performed with a current $I_w$ (kA); and
subsequently, a post-tempering heat treatment step in which after cooling is performed for a cooling time $t_{ct}$ (ms) shown in formula (1) below, current application is performed with a current $I_t$ (kA) shown in formula (2) below for a current application time $t_t$ (ms) shown in formula (3) below, and
between the main current application step and the post-tempering heat treatment step, a post-segregation reduction heat treatment step in which after cooling is performed for a cooling time $t_{co}$ (ms) shown in formula (4) below, current application is performed with a current $I_o$ (kA) shown in formula (5) below for a current application time $t_o$ (ms) shown in formula (6) below,
wherein at least one steel sheet in the sheet combination has a composition containing 0.08≤C≤0.3 (% by mass),

0.1≤Si≤0.8 (% by mass), 2.5≤Mn≤10.0 (% by mass), and P≤0.1 (% by mass), with the balance being Fe and unavoidable impurities:

$$800 \le t_{ct} \quad \text{formula (1)},$$

$$0.5 \times I_w \le I_t \le I_w \quad \text{formula (2)},$$

$$500 \le t_t \quad \text{formula (3)},$$

$$10 \le t_{cp} \quad \text{formula (4)},$$

$$0.6 \times I_w \le I_p \le 0.99 \times I_w \quad \text{formula (5), and}$$

$$400 \le t_p \quad \text{formula (6)}.$$

2. The resistance spot welding method according to claim 1, wherein at least one steel sheet in the sheet combination has the composition further contains, at least one selected from Cu≤3 (% by mass), Ni≤3 (% by mass), Mo≤1.0 (% by mass), Cr≤1.0 (% by mass), Nb≤0.2 (% by mass), V≤0.5 (% by mass), Ti≤0.2 (% by mass), B≤0.005 (% by mass), Al≤2 (% by mass), Ca≤0.010 (% by mass).

3. The resistance spot welding method according to claim 1, wherein at least one steel sheet in the sheet combination has a tensile strength of 780 MPa or more.

4. The resistance spot welding method according to claim 2, wherein at least one steel sheet in the sheet combination has a tensile strength of 780 MPa or more.

5. A method for producing a resistance spot welded joint by using the resistance spot welding method according to claim 1.

6. A method for producing a resistance spot welded joint by using the resistance spot welding method according to claim 2.

7. A method for producing a resistance spot welded joint by using the resistance spot welding method according to claim 3.

8. A method for producing a resistance spot welded joint by using the resistance spot welding method according to claim 4.

* * * * *

UNITED STATES PATENT AND TRADEMARK OFFICE
CERTIFICATE OF CORRECTION

| | | |
|---|---|---|
| PATENT NO. | : 11,992,892 B2 | Page 1 of 1 |
| APPLICATION NO. | : 16/967193 | |
| DATED | : May 28, 2024 | |
| INVENTOR(S) | : Reiko Endo et al. | |

It is certified that error appears in the above-identified patent and that said Letters Patent is hereby corrected as shown below:

In the Claims

In Column 18, Line 62, Claim 1: "$t_{co}$" should be -- $t_{cp}$ --.

In Column 18, Line 64, Claim 1: "$l_o$" should be -- $l_p$ --.

In Column 18, Line 65, Claim 1: "$t_o$" should be -- $t_p$ --.

Signed and Sealed this
Fifth Day of November, 2024

Katherine Kelly Vidal
*Director of the United States Patent and Trademark Office*